United States Patent
Edberg

(10) Patent No.: US 11,807,064 B2
(45) Date of Patent: Nov. 7, 2023

(54) ANTI-ROLL WHEEL SUSPENSION SYSTEM FOR VEHICLES, AND A METHOD FOR PERFORMING ANTI-ROLL OF A VEHICLE WITH AN ANTI-ROLL WHEEL SUSPENSION SYSTEM

(71) Applicant: Ningbo Geely Automobile Research & Development Co., Ltd., Ningbo (CN)

(72) Inventor: Martin Edberg, Gothenburg (SE)

(73) Assignee: Ningbo Geely Automobile Research & Development Co., Ningbo (CN)

(*) Notice: Subject to any disclaimer, the term of this patent is extended or adjusted under 35 U.S.C. 154(b) by 0 days.

(21) Appl. No.: 17/727,786

(22) Filed: Apr. 24, 2022

(65) Prior Publication Data
US 2022/0242192 A1 Aug. 4, 2022

Related U.S. Application Data

(63) Continuation of application No. PCT/CN2020/122568, filed on Oct. 21, 2020.

(30) Foreign Application Priority Data

Nov. 15, 2019 (EP) .................................... 19209459

(51) Int. Cl.
| | |
|---|---|
| *B60G 21/05* | (2006.01) |
| *B60G 11/16* | (2006.01) |
| *B60G 21/02* | (2006.01) |

(52) U.S. Cl.
CPC ............. *B60G 21/05* (2013.01); *B60G 11/16* (2013.01); *B60G 21/026* (2013.01);
(Continued)

(58) Field of Classification Search
CPC ...... B60G 21/05; B60G 11/16; B60G 21/026; B60G 2202/312; B60G 2204/13;
(Continued)

(56) References Cited

U.S. PATENT DOCUMENTS

| 3,083,983 A | 4/1963 | Wettstein | |
|---|---|---|---|
| 5,765,846 A * | 6/1998 | Braun | ................. B60G 21/026 280/124.103 |

(Continued)

FOREIGN PATENT DOCUMENTS

| AU | 8093375 A | 11/1976 |
|---|---|---|
| CN | 1535855 A | 10/2004 |

(Continued)

OTHER PUBLICATIONS

DE-102009027349-A1 Wolfgang original document and translation, published 2011, retrieved 2023 (Year: 2011).*

(Continued)

*Primary Examiner* — James A English
*Assistant Examiner* — Caitlin Anne Miller
(74) *Attorney, Agent, or Firm* — TUCKER ELLIS LLP

(57) ABSTRACT

An anti-roll wheel suspension system for vehicles includes a first suspension spring and a first damper arranged to be connected to a first wheel, and a second suspension spring and a second damper arranged to be connected to a second wheel. The system further includes a centre part operatively connected to the first suspension spring and the first damper, and operatively connected to the second suspension spring and the second damper. The centre part is arranged between the first suspension spring and the second suspension spring, and between the first damper and the second damper. The centre part is movably arranged in a transverse direction. The centre part, when moving in the transverse direction upon activation from the first wheel and/or the second wheel, is configured for impacting the stiffness of the first suspension spring and/or the second suspension spring.

16 Claims, 5 Drawing Sheets

(52) U.S. Cl.
CPC .... *B60G 2202/312* (2013.01); *B60G 2204/13* (2013.01); *B60G 2204/419* (2013.01); *B60G 2204/421* (2013.01); *B60G 2204/423* (2013.01); *B60G 2204/82* (2013.01); *B60G 2204/83022* (2013.01)

(58) Field of Classification Search
CPC ........ B60G 2204/419; B60G 2204/421; B60G 2204/423; B60G 2204/82; B60G 2204/83022; B60G 2204/12
USPC .................................................. 280/124.106
See application file for complete search history.

(56) References Cited

U.S. PATENT DOCUMENTS 6,302,417 B1 * 10/2001 Heyring ............... B60G 21/067
   280/124.152
2003/0184037 A1   10/2003 Zadok

FOREIGN PATENT DOCUMENTS

| | | | |
|---|---|---|---|
| CN | 109318675 A | 2/2019 | |
| DE | 10221697 A1 | 12/2003 | |
| DE | 102007006499 A1 | 4/2008 | |
| DE | 102009027349 A1 | 1/2011 | |
| DE | 102009057194 A1 * | 6/2011 | .......... B60G 21/026 |
| FR | 1503032 A | 11/1967 | |
| FR | 3057813 A1 | 4/2018 | |
| KR | 20080054639 A | 6/2008 | |
| KR | 10-2018-0039447 A | 4/2018 | |
| WO | 9706971 A1 | 2/1997 | |

OTHER PUBLICATIONS

International Search Report from corresponding International Application No. PCT/CN2020/122568, dated Jan. 21, 2021, 2 pages.

* cited by examiner

ANTI-ROLL WHEEL SUSPENSION SYSTEM FOR VEHICLES, AND A METHOD FOR PERFORMING ANTI-ROLL OF A VEHICLE WITH AN ANTI-ROLL WHEEL SUSPENSION SYSTEM

RELATED APPLICATION DATA

This application is a continuation of International Patent Application No. PCT/CN2020/122568, filed Oct. 21, 2020, which claims the benefit of European Patent Application No. 19209459.7, filed Nov. 15, 2019, the disclosures of which are incorporated herein by reference in their entireties.

TECHNICAL FIELD

The present disclosure relates to an anti-roll wheel suspension system for vehicles, comprising a first suspension spring and a first damper arranged to be connected to a first wheel, and a second suspension spring and a second damper arranged to be connected to a second wheel. The disclosure further relates to a vehicle comprising an anti-roll wheel suspension system, and a method for performing anti-roll of a vehicle with an anti-roll wheel suspension system.

BACKGROUND

Modern vehicles are often equipped with constructional elements that are preventing unwanted vehicle movements, such as for example vehicle body roll during certain driving conditions. Such constructional elements may for example be a conventional anti-roll bar that is transferring suspension stiffness from one side of the vehicle to the opposite side. This will cause less tilting or roll of the vehicle when performing a sharp turn. The vehicle body roll is related to the load transfer of the vehicle towards the outside of a turn. Vehicles are commonly fitted with a suspension system keeping the wheels of the vehicle in contact with the road, and providing grip for the driver of vehicle to control the vehicle direction. The suspension is enabling the vehicle body, which sits upon the suspension, to lean in the direction of the perceived force acting upon the car. The anti-roll bars are a part of vehicle suspension systems specifically designed to address body roll. However, if a wheel of the vehicle for example hits a road bump on one vehicle side, the traditional anti-roll bar will also transfer stiffness to the opposite side making the vehicle less comfortable. Hence, the conventional anti-roll bar is a trade-off between turn comfort and one side road bump handling.

There is thus a need for an improved anti-roll wheel suspension system for vehicles, where transfer of suspension stiffness from one side of the vehicle to the other if the vehicle hits a road bump is prevented, and where the system is efficiently preventing vehicle body roll.

SUMMARY

An object of the present disclosure is to provide an anti-roll wheel suspension system for vehicles, a vehicle comprising an anti-roll wheel suspension system, and a method for performing anti-roll of a vehicle with an anti-roll wheel suspension system, where the previously mentioned problems are avoided. This object is at least partly achieved by the features of the independent claims. The dependent claims contain further developments of the anti-roll wheel suspension system for vehicles and the method for performing anti-roll of a vehicle with an anti-roll wheel suspension system.

The disclosure concerns an anti-roll wheel suspension system for vehicles, comprising a first suspension spring and a first damper arranged to be connected to a first wheel, and a second suspension spring and a second damper arranged to be connected to a second wheel. The system further comprises a centre part operatively connected to the first suspension spring and the first damper, and operatively connected to the second suspension spring and the second damper. The centre part is arranged between the first suspension spring and the second suspension spring, and between the first damper and the second damper. The centre part is movably arranged in a transverse direction. The centre part is when moving in the transverse direction upon activation from the first wheel and/or the second wheel configured for impacting the stiffness of the first suspension spring and/or the second suspension spring.

Advantages with these features are that unwanted vehicle movements are prevented with the anti-roll wheel suspension system. Through the configuration of the system, with suspension springs, dampers, and movable centre part, the vehicle body roll is efficiently prevented and unwanted transfer of stiffness to the opposite side of the vehicle can be prevented if the vehicle for example hits a road bump on one vehicle side. Further, the movement of the centre part in the transverse direction upon activation from the first wheel and/or the second wheel impacting the stiffness of the first suspension spring and/or the second suspension spring makes the vehicle more comfortable to ride.

According to an aspect of the disclosure, the first suspension spring and the first damper are arranged to be connected to the first wheel via a first lever and a first suspension arm, and the second suspension spring and the second damper are arranged to be connected to the second wheel via a second lever and a second suspension arm. The first suspension arm is connected to and extending between the first wheel and the first lever, and the second suspension arm is connected to and extending between the second wheel and the second lever. The first damper and the first suspension spring are connected to and extending between the first lever and the centre part, and the second damper and the second suspension spring are connected to and extending between the second lever and the centre part. The first lever and the first suspension arm are configured for interacting with each other, and the second lever and the second suspension arm are configured for interacting with each other. Upon activation of the first lever by the first wheel and the first suspension arm the first lever is rotating around a first axis, and upon activation of the second lever by the second wheel and the second suspension arm the second lever is rotating around a second axis. The respective levers and suspension arms are through the interaction with the other parts of the suspension system cooperating to prevent roll and increase the vehicle comfort. The connections of the dampers and suspension springs to the levers are establishing a functionality of the system, where the dampers can be used for dampening the rotational movements of the levers. The roll can be efficiently prevented through the dampening of the rotational movements of the levers, and mainly through the spring stiffness change connected to the rotational movements of the levers.

According to another aspect of the disclosure, the centre part is arranged to be slidingly connected to at least one elongated guide bar extending in the transverse direction. The centre part is upon activation of the first lever and/or the second lever configured for sliding in the transverse direction along the at least one guide bar and the centre part is when sliding in the transverse direction configured for impacting the stiffness of the first suspension spring and/or the second suspension spring. Upon activation of the first lever the first damper and the first suspension spring are configured for counteracting a rotary movement of the first lever around the first axis, and upon activation of the second lever the second damper and the second suspension spring are configured for counteracting a rotary movement of the second lever around the second axis. The sliding movement of the centre part in the transverse direction is impacting the stiffness of the suspension springs and is counteracting the rotational movements of the levers, which in turn is minimizing the roll of the vehicle.

According to an aspect of the disclosure, the system further comprises a centre part damper, where the centre part damper is configured for dampening a movement of the centre part in the transverse direction. The dampening of the centre part is further increasing the comfort of the vehicle.

According to another aspect of the disclosure, the system further comprises a first wire, a second wire, and a wire restricting unit attached to the centre part. The first wire is connected to and extending between the first lever and the wire restricting unit, and the second wire is connected to and extending between the second lever and the wire restricting unit. Upon activation of the first lever the first wire is arranged for restricting the rotary movement of the first lever, and upon activation of the second lever the second wire is arranged for restricting the rotary movement of the second lever. Upon activation of the first lever the wire restricting unit is configured for dampening a movement of the first wire, and upon activation of the second lever the wire restricting unit is configured for dampening and/or restricting a movement of the second wire. The wires are further counteracting the rotational movements of the levers in one direction, where the directions may be opposite for the two levers.

According to an aspect of the disclosure, the wire restricting unit comprises a piston movably arranged in a longitudinal direction in relation to the centre part, a secondary damper, and a secondary suspension spring. The first wire and the second wire are connected to the piston, and the secondary damper and the secondary suspension spring are arranged for dampening and/or restricting the movement of the piston in the longitudinal direction. The piston is connecting the wires to the dampening and/or restricting function of the centre part, and the secondary damper is used for dampening and/or restricting the movements of the wires.

According to another aspect of the disclosure, the wire restricting unit further comprises a spring-loaded locking pin, where the spring-loaded locking pin is arranged for blocking the movement of the piston when a side force above a predetermined force level is impacting the system in the transverse direction. The locking pin is used for preventing the dampening function of the wires when high side forces are impacting the system, which for example is desirable when the vehicle is performing sharper turns in order to efficiently preventing the body roll, since the locking pin will cause the centre part to move in the transverse direction. Through the blocking of the piston movement, the respective wires are efficiently restricting the movements of the corresponding levers. The movement of the centre part will also impact the movements of the levers.

According to a further aspect of the disclosure, the locking pin comprises a first locking surface and a second locking surface, and the centre part comprises a first recess and a second recess. The first locking surface is arranged for engaging the first recess when the side force is acting in a first direction, and the second locking surface is arranged for engaging the second recess when the side force is acting in a second direction, where the first direction and the second direction are opposite each other. The locking surfaces and the cooperating recesses are efficiently blocking the movement of the piston.

According to an aspect of the disclosure, the wire restricting unit comprises a first guide wheel arranged for guiding the movement of the first wire, and a second guide wheel arranged for guiding the movement of the second wire. The guide wheels are guiding the wires for a smooth movement of the wires in relation to the centre part.

According to another aspect of the disclosure, the wire restricting unit is arranged inside the centre part. With the arrangement of the wire restricting unit inside the centre part, the wire restricting unit is protected from dust or impacts from objects.

According to a further aspect of the disclosure, the first lever is connected to a first lever bevel gear wheel and the second lever is connected to a second lever bevel gear wheel. The first suspension arm is connected to a first arm bevel gear wheel and the second suspension arm is connected to a second arm bevel gear wheel. The first lever bevel gear wheel is in engagement with the first arm bevel gear wheel and the second lever bevel gear wheel is in engagement with the second arm bevel gear wheel. The gear wheels are used for transferring the rotational movements of the suspension arms from the wheels to the respective levers.

According to other aspects of the disclosure, the first lever bevel gear wheel is arranged for rotating around the first axis and the second lever bevel gear wheel is arranged for rotating around the second axis. The first arm bevel gear wheel is arranged for rotating around a third axis and the second arm bevel gear wheel is arranged for rotating around a fourth axis. Further, the third axis may be perpendicular to the first axis, and the second axis may be perpendicular to the fourth axis.

According to other aspects of the disclosure, upon activation the first lever is rotating in a first rotational direction around the first axis, and upon activation the second lever is rotating in a second rotational direction around the second axis, where the first rotational direction and the second rotational direction are opposite each other. Further, the first damper is connected to a first lever end of the first lever and the second damper is connected to a first lever end of the second lever. Upon activation the first lever end of the first lever is rotating in the first rotational direction towards the centre part, and upon activation the first lever end of the second lever is rotating in the second rotational direction towards the centre part.

The disclosure further concerns a vehicle comprising an anti-roll wheel suspension system.

The disclosure further concerns a method for performing anti-roll of a vehicle with an anti-roll wheel suspension system for vehicles. The system comprises a first suspension spring and a first damper arranged to be connected to a first wheel, and a second suspension spring and a second damper arranged to be connected to a second wheel. The system further comprises a centre part operatively connected to the first suspension spring and the first damper, and operatively connected to the second suspension spring and the second damper. The centre part is arranged between the first suspension spring and the second suspension spring, and between the first damper and the second damper. The centre part is movably arranged in a transverse direction. The method comprises the steps; moving the centre part in the transverse direction upon activation from the first wheel and/or the second wheel, where the centre part upon movement is impacting the stiffness of the first suspension spring and/or the second suspension spring.

Advantages with these features are that unwanted vehicle movements are prevented with the method. Through the configuration of the system, with suspension springs, dampers, and movable centre part, the vehicle body roll is efficiently prevented and unwanted transfer of stiffness to the opposite side of the vehicle can be prevented if the vehicle for example hits a road bump on one vehicle side. As described above, the movement of the centre part in the transverse direction upon activation from the first wheel and/or the second wheel impacting the stiffness of the first suspension spring and/or the second suspension spring makes the vehicle more comfortable to ride.

According to an aspect of the disclosure, the first suspension spring and the first damper are arranged to be connected to the first wheel via a first lever and a first suspension arm, and the second suspension spring and the second damper are arranged to be connected to the second wheel via a second lever and a second suspension arm. The first suspension arm is connected to and extending between the first wheel and the first lever, and the second suspension arm is connected to and extending between the second wheel and the second lever. The first damper and the first suspension spring are connected to and extending between the first lever and the centre part, and the second damper and the second suspension spring are connected to and extending between the second lever and the centre part. The first lever and the first suspension arm are configured for interacting with each other, and the second lever and the second suspension arm are configured for interacting with each other. The method further comprises the steps; rotating the first lever around a first axis upon activation of the first lever by the first wheel and the first suspension arm, and rotating the second lever around a second axis upon activation of the second lever by the second wheel and the second suspension arm. The connections of the dampers and suspension springs to the levers are dampening and/or restricting the rotational movements of the levers. Through the dampening and/or restricting of the rotational movements, vehicle body roll can efficiently be prevented.

According to another aspect of the disclosure, the centre part is arranged to be slidingly connected to at least one elongated guide bar extending in the transverse direction, where the centre part upon activation of the first lever and/or the second lever is configured for sliding in the transverse direction along the at least one guide bar. The centre part is when sliding in the transverse direction configured for impacting the stiffness of the first suspension spring and/or the second suspension spring. The method further comprises the steps; counteracting the rotary movement of the first lever around the first axis by the first damper and the first suspension spring upon activation of the first lever, and counteracting the rotary movement of the second lever around the second axis by the second damper and the second suspension spring upon activation of the second lever. The sliding movement of the centre part in the transverse direction is impacting the stiffness of the suspension springs and is counteracting the rotational movements of the levers.

According to an aspect of the disclosure, the system further comprises a first wire, a second wire, and a wire restricting unit attached to the centre part. The first wire is connected to and extending between the first lever and the wire restricting unit, and the second wire is connected to and extending between the second lever and the wire restricting unit. The method further comprises the steps; restricting the rotary movement of the first lever with the first wire upon activation of the first lever, and restricting the rotary movement of the second lever with the second wire upon activation of the second lever; where upon activation of the first lever the wire restricting unit is dampening a movement of the first wire, and where upon activation of the second lever the wire restricting unit is dampening a movement of the second wire. The wires are further counteracting the rotational movements of the levers in one direction, where the directions may be opposite for the two levers.

According to another aspect of the disclosure, the method further comprises the steps; upon activation of the first lever dampening a movement of the first wire with the wire restricting unit when a side force equal to or below a predetermined force level is impacting the system in the transverse direction, where the wire restricting unit is prevented from dampening the movement of the first wire when a side force above the predetermined force level is impacting the system in the transverse direction; and upon activation of the second lever dampening a movement of the second wire with the wire restricting unit when the side force equal to or below the predetermined force level is impacting the system in the transverse direction, where the wire restricting unit is prevented from dampening the movement of the second wire when a side force above the predetermined force level is impacting the system in the transverse direction. The dampening function of the wires is prevented when high side forces are impacting the system, which for example is desirable when the vehicle is performing sharper turns in order to efficiently prevent the body roll. When driving without high side forces the wires can be dampened, for example if the wheel of the vehicle hits a bump in the road.

BRIEF DESCRIPTION OF THE DRAWINGS

The disclosure will be described in detail in the following, with reference to the attached drawings, in which.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
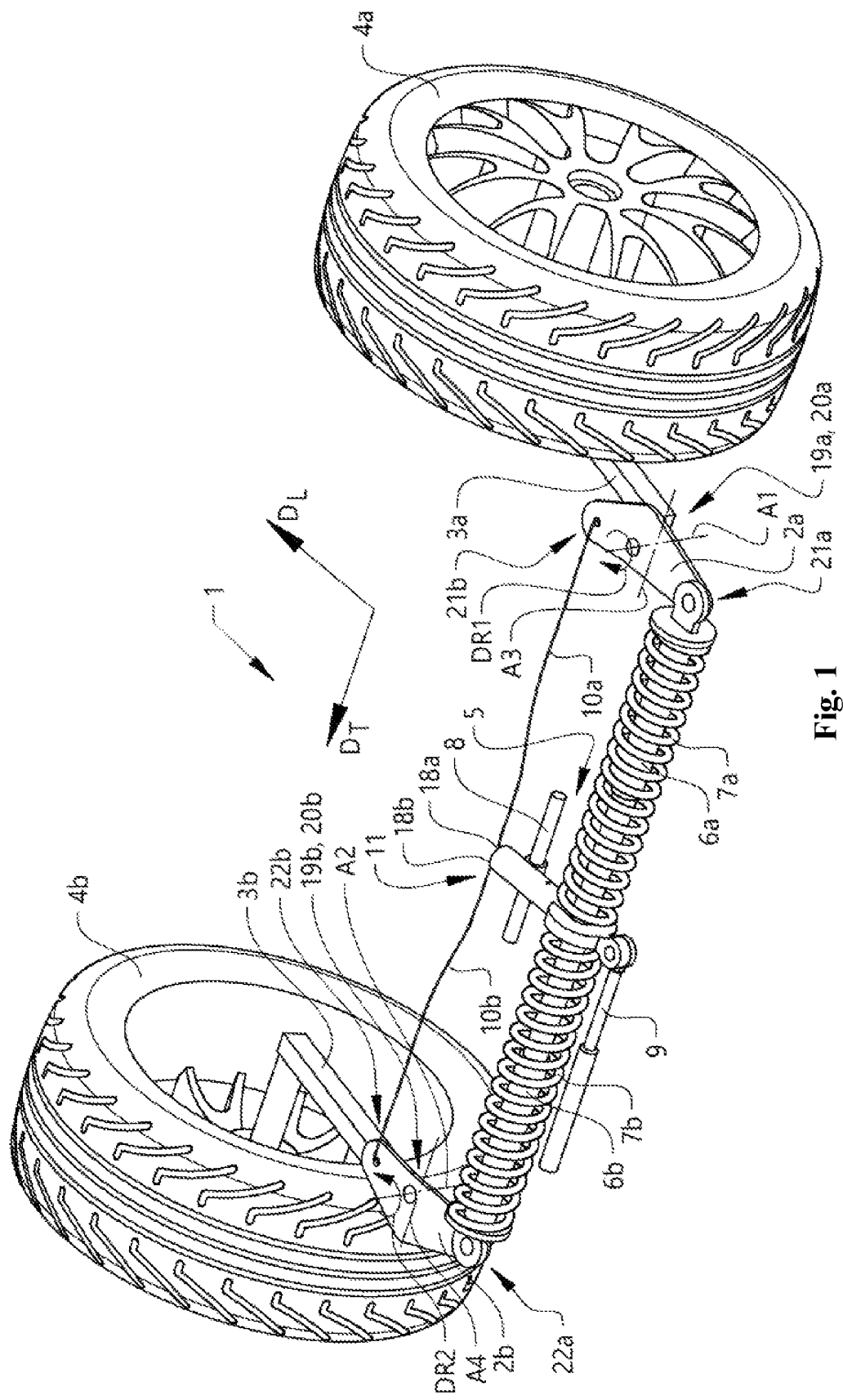
FIG. 1 shows schematically, in a perspective view, an anti-roll wheel suspension system for vehicles according to the disclosure.

FIG. 1 schematically shows in a perspective view an anti-roll wheel suspension system 1 for vehicles, and as shown in the figure the anti-roll wheel suspension system 1 is illustrated together with a first wheel 4a and a second wheel 4b of the vehicle. The anti-roll wheel suspension system 1 may be used in any type of vehicle construction where there is a need for preventing unwanted roll tendencies of the vehicle in different driving conditions. The pair of wheels illustrated may for example be a pair of front wheels or a pair of rear wheels arranged in connection to the vehicle. The anti-roll wheel suspension system may suitably be used on all wheel pairs of the vehicle. To simplify the understanding of the system, other vehicle components, such as for example steering components, suspension components, powertrain components or other components needed are not shown in the figures.

The anti-roll wheel suspension system 1 comprises a first suspension spring 7a and a first damper 6a indirectly connected to the first wheel 4a, and a second suspension spring 7b and a second damper 6b indirectly connected to the second wheel 4b. The system 1 further comprises a centre part 5. The centre part 5 is operatively connected to the first suspension spring 7a and the first damper 6a, and the centre part 5 is further operatively connected to the second suspension spring 7b and the second damper 6b, as illustrated in FIG. 1. The first damper 6a and the second damper 6b may at respective inner ends be connected to the centre part 5 with any suitable type of fastening means. The first damper 6a and the second damper 6b may for example be pivotally connected to the centre part 5 through a joint connection, allowing the respective dampers to pivot in relation to the centre part 5. The first damper 6a is as further shown in FIG. 1 arranged inside the first suspension spring 7a, and the second damper 6b is arranged inside the second suspension spring 7b. The dampers and suspension springs may have any suitable configuration. The spring and damper packages formed are used for impacting and dampening the movement of the centre part 5 and the respective wheels in order to prevent roll of the vehicle, as will be further explained below.

Figure 2:
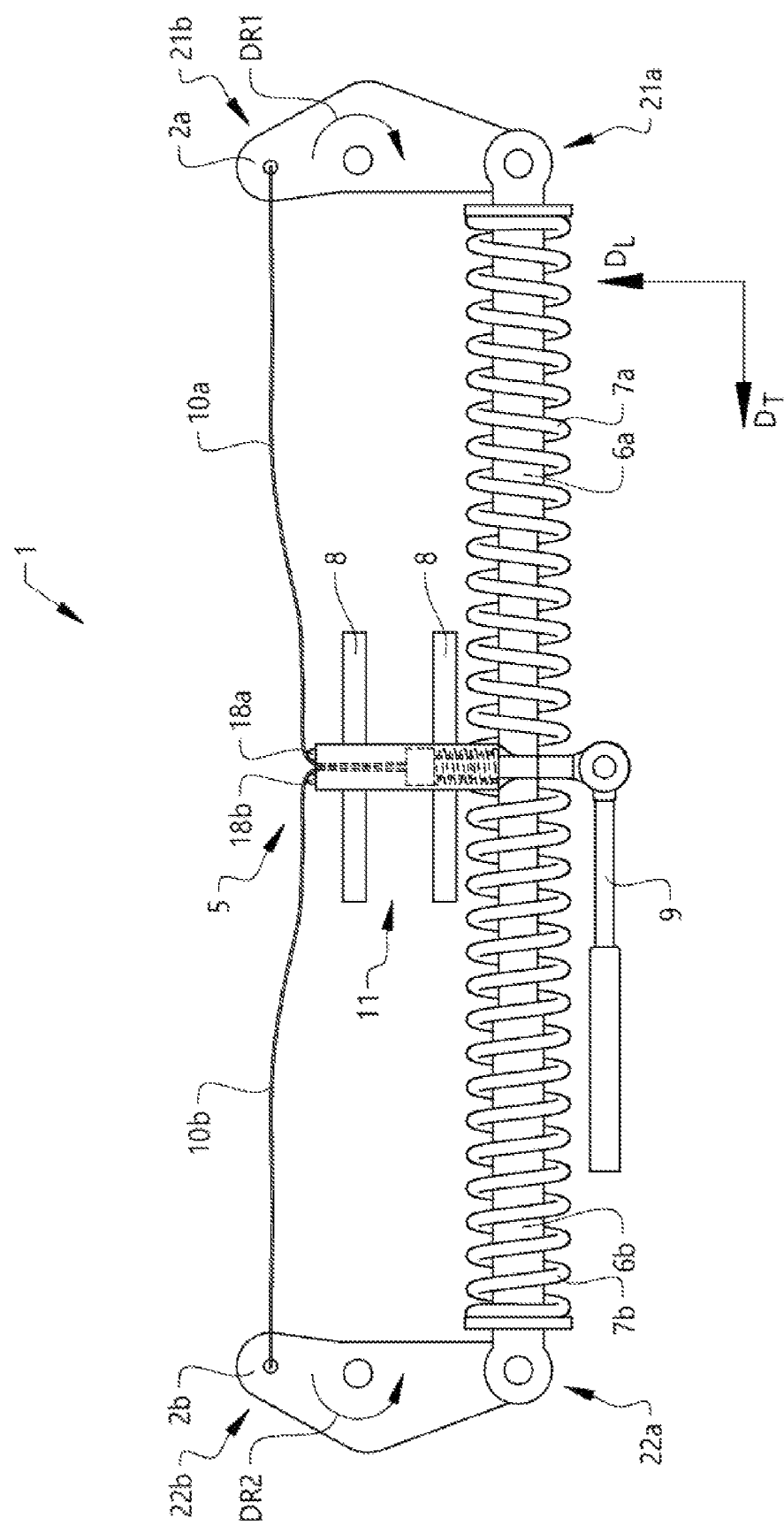
FIG. 2 shows schematically, in a view from above, a section of the anti-roll wheel suspension system with a centre part according to the disclosure.

As illustrated in FIGS. 1 and 2, the centre part 5 is arranged between the first suspension spring 7a and the second suspension spring 7b, and between the first damper 6a and the second damper 6b. The centre part 5 is movably arranged in a transverse direction $D_T$ upon activation from the first wheel 4a and/or the second wheel 4b. When moving in the transverse direction $D_T$, the centre part 5 upon activation from the first wheel 4a and/or the second wheel 4b is configured for impacting the stiffness of the first suspension spring 7a and/or the second suspension spring 7b. With the configuration of the system 1 described, the centre part 5 is thus moving in the transverse direction $D_T$ upon activation from the first wheel 4a and/or the second wheel 4b, where the centre part 5 upon movement is impacting the stiffness of the first suspension spring 7a and/or the second suspension spring 7b. As will be further explained below, the movement of the centre part 5 will take place when a side force is acting on the system.

Figure 3:
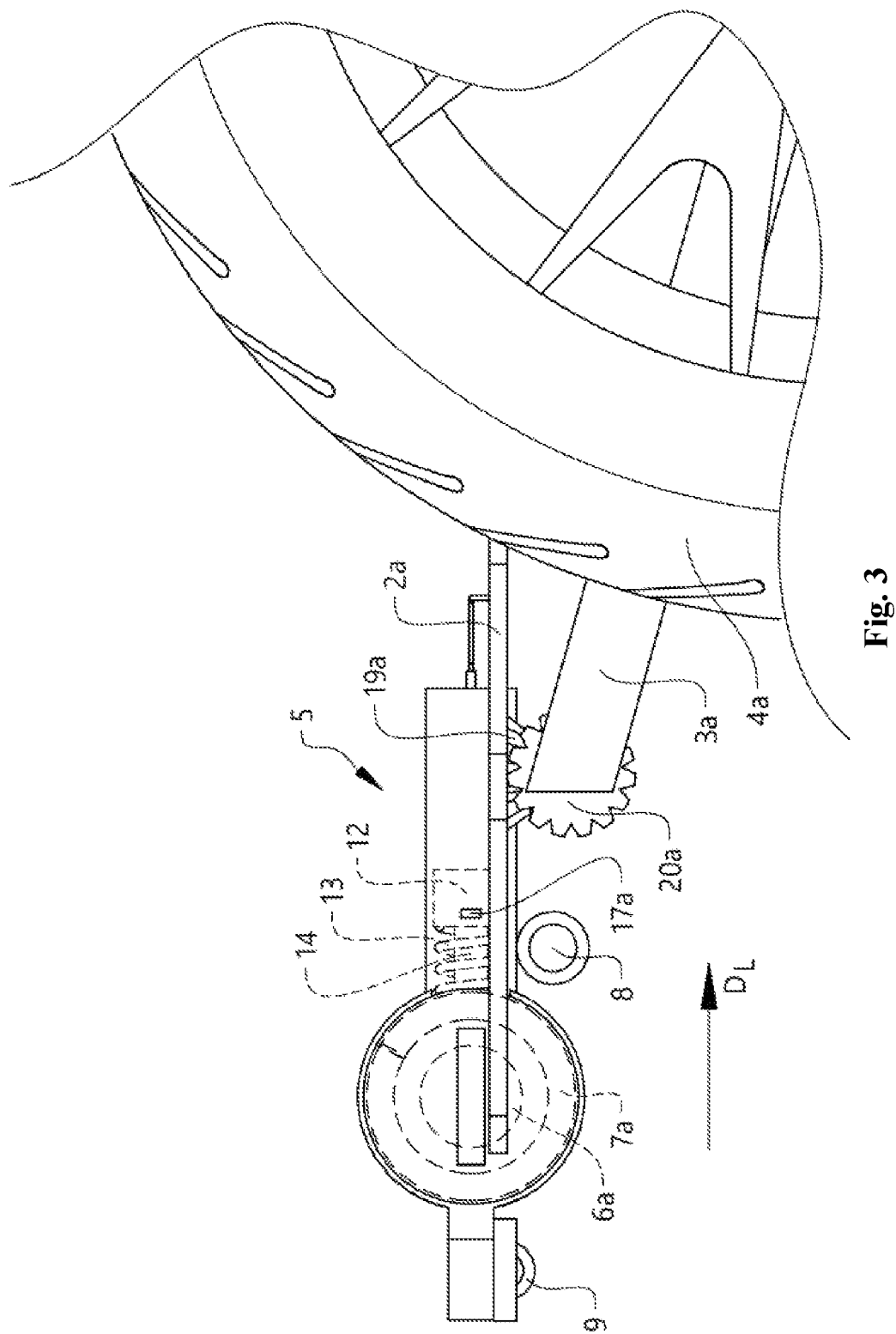
FIG. 3 shows schematically, in a side view, a section of the anti-roll wheel suspension system according to the disclosure.
Figure 4:
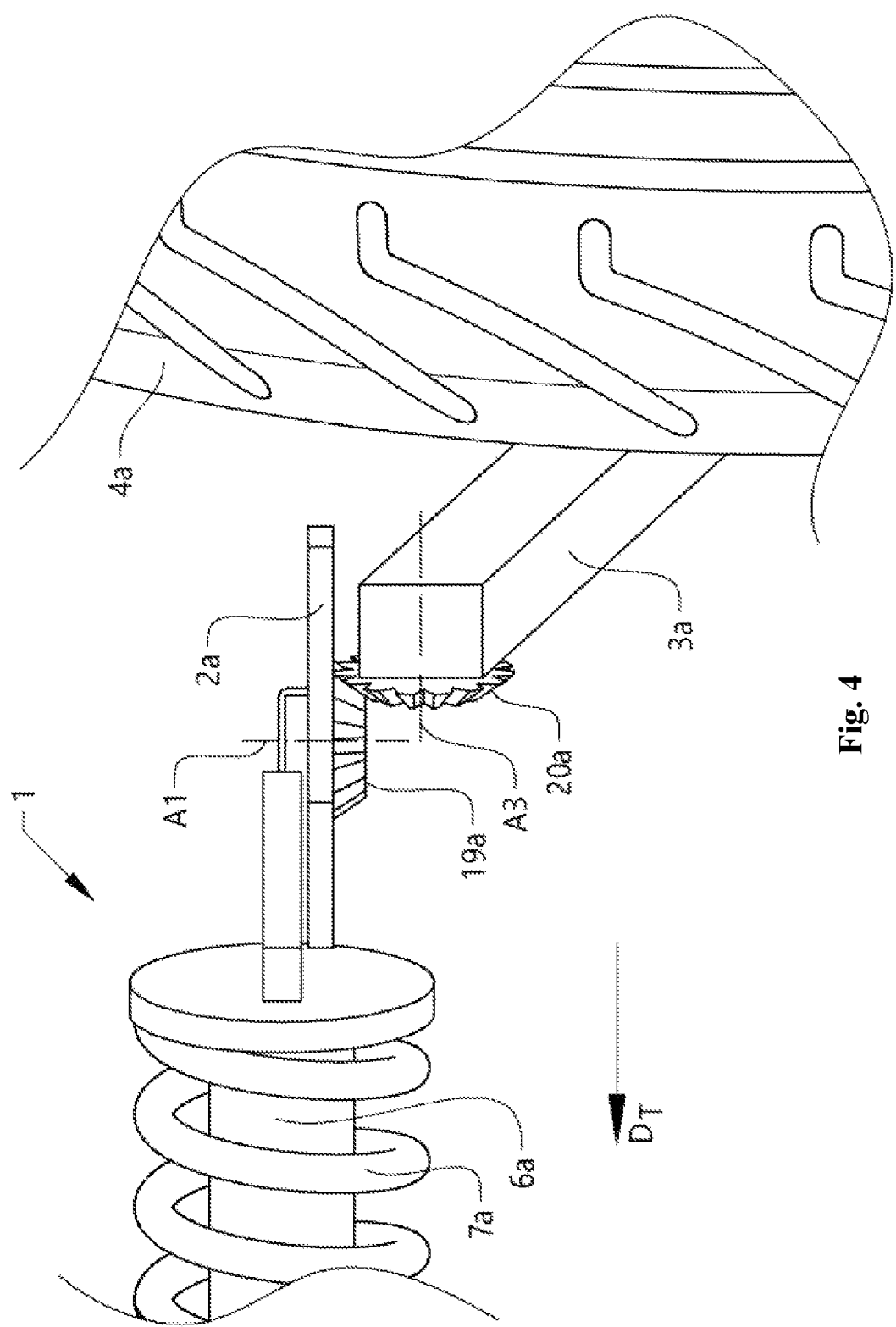
FIG. 4 shows schematically, in a perspective view, a section of the anti-roll wheel suspension system according to the disclosure.

The first suspension spring 7a and the first damper 6a are connected to the first wheel 4a via a first lever 2a and a first suspension arm 3a, and together constitute components of the system 1 arranged on a left hand side of the vehicle, as shown in FIG. 1. The first suspension arm 3a is connected to the first wheel 4a and is arranged to move with the first wheel 4a, for example when the first wheel 4a is impacted by a force in a sharp turn or if hitting a bump in the road. As illustrated in FIGS. 1, 3 and 4, the first suspension arm 3a is connected to and extending between the first wheel 4a and the first lever 2a. The first damper 6a and the first suspension spring 7a are connected to and extending between the first lever 2a and the centre part 5. The first lever 2a and the first suspension arm 3a are configured for interacting with each other. Upon activation of the first lever 2a by the first wheel 4a and the first suspension arm 3a, the first lever 2a is rotating around a first axis $A_1$, as shown in FIGS. 1 and 4. The first lever 2a is pivotally arranged around a first pivot point with suitable constructional details and configured to rotate around the first axis $A_1$. Upon activation of the first suspension arm 3a by the first wheel 4a, the first suspension arm 3a is rotating around a third axis $A_3$. The first suspension arm 3a is pivotally arranged around a third pivot point with suitable constructional details and configured to rotate around the third axis $A_3$. With the configuration of the system 1 described, the first lever 2a is thus being rotated around the first axis $A_1$ upon activation of the first lever 2a by the first wheel 4a and the first suspension arm 3a, where the first suspension arm 3a is being rotated around the third axis $A_3$.

The first lever 2a comprises a first lever end 21a and a second lever end 21b, as illustrated in FIGS. 1 and 2. The first pivot point, and thus the first axis $A_1$, is arranged between the first lever end 21a and the second lever end 21b of the first lever 2a.

As illustrated in FIGS. 1 and 4, the first lever 2a is connected to a first lever bevel gear wheel 19a arranged in connection to the first pivot point, and the first suspension arm 3a is connected to a first arm bevel gear wheel 20a arranged in connection to the third pivot point. The first lever bevel gear wheel 19a and the first arm bevel gear wheel 20a are connected to and arranged to interact with each other. As shown in the figures, the first lever bevel gear wheel 19a is in engagement with the first arm bevel gear wheel 20a. The first lever bevel gear wheel 19a is arranged for rotating around the first axis $A_1$, and the first arm bevel gear wheel 20a is arranged for rotating around the third axis $A_3$. The first axis $A_1$ may be perpendicular to the third axis $A_3$, but other angles can be used if suitable. Upon activation from the first wheel 4a and the first suspension arm 3a, the first lever 2a is rotating in a first rotational direction $D_{R1}$ around the first axis $A_1$, as shown in FIGS. 1 and 2. Further, upon activation from the first wheel 4a, the first suspension arm 3a is rotating in a direction upwards in relation to the configuration of the system shown in FIGS. 1 and 3. When impacted by a force, as described above, the first wheel 4a is moving in a direction upwards following the first suspension arm 3a around its pivot point, and the pivotal arrangement of the first suspension arm 3a in the third pivot point around the third axis $A_3$ is allowing the first suspension arm 3a to rotate in the direction upwards.

The second suspension spring 7b and the second damper 6b are connected to the second wheel 4b via a second lever 2b and a second suspension arm 3b, and together constitute components of the system 1 arranged on a right hand side of the vehicle, as shown in FIG. 1. The second suspension arm 3b is connected to the second wheel 4b and is arranged to move with the second wheel 4b, for example when the second wheel 4b is impacted by a force in a sharp turn or if hitting a bump in the road. As shown in FIG. 1, the second suspension arm 3b is connected to and extending between the second wheel 4b and the second lever 2b. The second damper 6b and the second suspension spring 7b are connected to and extending between the second lever 2b and the centre part 5. The second lever 2b and the second suspension arm 3b are configured for interacting with each other. Upon activation of the second lever 2b by the second wheel 4b and the second suspension arm 3b, the second lever 2b is rotating around a second axis $A_2$, as shown in FIG. 1. The second lever 2b is pivotally arranged around a second pivot point with suitable constructional details and configured to rotate around the second axis $A_2$. Upon activation of the second suspension arm 3b by the second wheel 4b, the second suspension arm 3b is rotating around a fourth axis $A_4$. The second suspension arm 3b is pivotally arranged around a fourth pivot point with suitable constructional details and configured to rotate around the fourth axis $A_4$. With the configuration of the system 1 described, the second lever 2b is thus being rotated around the second axis $A_2$ upon activation of the second lever 2b by the second wheel 4b and the second suspension arm 3b, where the second suspension arm 3b is being rotated around the fourth axis $A_4$.

The second lever 2b comprises a first lever end 22a and a second lever end 22b, as illustrated in FIGS. 1 and 2. The second pivot point, and thus the second axis $A_2$, is arranged between the first lever end 22a and the second lever end 22b of the second lever 2b.

In a similar way as described above in connection to the first lever 2a, the second lever 2b is connected to a second lever bevel gear wheel 19b arranged in connection to the second pivot point, as indicated in FIG. 1, and the second suspension arm 3b is connected to a second arm bevel gear wheel 20b arranged in connection to the fourth pivot point. The second lever bevel gear wheel 19b and the second arm bevel gear wheel 20b are connected to and arranged to interact with each other. The second lever bevel gear wheel 19b is in engagement with the second arm bevel gear wheel 20b. The second lever bevel gear wheel 19b is arranged for rotating around the second axis $A_2$, and the second arm bevel gear wheel 20b is arranged for rotating around the fourth axis $A_4$. The second axis $A_2$ may be perpendicular to the fourth axis $A_4$, but other angles can be used if suitable. Upon activation from the second wheel 4b and the second suspension arm 3b, the second lever 2b is rotating in a second rotational direction $D_{R2}$ around the second axis $A_2$, as shown in FIGS. 1 and 2. Further, upon activation from the second wheel 4b, the second suspension arm 3b is rotating in a direction upwards in relation to the configuration of the system shown in FIG. 1. When impacted by a force, as described above, the second wheel 4b is moving in a direction upwards following the second suspension arm 3b around its pivot point, and the pivotal arrangement of the second suspension arm 3b in the fourth pivot point around the fourth axis $A_4$ is allowing the second suspension arm 3b to rotate in the direction upwards.

In the configuration described, and as illustrated in the figures, the first rotational direction $D_{R1}$ and the second rotational direction $D_{R2}$ are opposite each other.

As illustrated in FIGS. 1 and 2, the first damper 6a is connected to the first lever end 21a of the first lever 2a and the second damper 6b is connected to the first lever end 22a of the second lever 2b. The respective dampers may be connected to the lever ends with suitable constructional details. The first damper 6a and the second damper 6b may be connected at respective outer ends to the corresponding levers with any suitable type of fastening means. The first damper 6a and the second damper 6b may for example be pivotally connected to the respective levers through joint connections, allowing the respective dampers to pivot in relation to the corresponding lever.

Upon activation from the first wheel 4a and the first suspension arm 3a in a direction upwards, the first lever end 21a of the first lever 2a is rotating in the first rotational direction $D_{R1}$ towards the centre part 5. In a similar way, upon activation from the second wheel 4b and the second suspension arm 3b in a direction upwards, the first lever end 22a of the second lever 2b is rotating in the second rotational direction $D_{R2}$ towards the centre part 5. The rotational directions are shown in FIGS. 1 and 2, and the respective bevel gears are transferring the rotational movements from the suspension arms to the levers. Thus, when activated, the first lever end 21a is moving in a direction towards the centre part 5, and the second lever end 22a is moving in a direction towards the centre part 5.

The centre part 5 is arranged to be slidingly connected to at least one elongated guide bar 8 extending in the transverse direction $D_T$. In the embodiment shown in FIGS. 1-5, the system comprises two elongated guide bars 8 extending in the transverse direction $D_T$, and the centre part 5 is arranged to slide along the two guide bars 8. If suitable, only one elongated guide bar 8 may be used instead, or in other embodiments, three or more elongated guide bars 8 may be used if desired. The centre part 5 is upon activation of the first lever 2a through the first suspension spring 7a configured for sliding in the transverse direction $D_T$ along the guide bars 8. Upon activation, the first lever end 21a of the first lever 2a is pushing the centre part 5 in a direction towards the second suspension spring 7b. The centre part 5 is upon activation of the second lever 2b through the second suspension spring 7b configured for sliding in the transverse direction $D_T$ along the guide bars 8. Upon activation, the first lever end 22a of the second lever 2b is pushing the centre part 5 in a direction towards the first suspension spring 7a. The centre part 5 is thus when sliding in the transverse direction $D_T$ configured for impacting the stiffness of the first suspension spring 7a and/or the second suspension spring 7b. Upon activation of the first lever 2a, the first damper 6a and the first suspension spring 7a are through the spring and damper configuration counteracting the rotary movement of the first lever 2a around the first axis $A_1$. Upon activation of the second lever 2b, the second damper 6b and the second suspension spring 7b are through the spring and damper configuration counteracting a rotary movement of the second lever 2b around the second axis $A_2$. The counteracting movements are preventing the roll tendency of the vehicle through the stiffening of the respective suspension springs, and the respective dampers are damping the movement of the components involved.

With the configuration of the system 1 described, the rotary movement of the first lever 2a around the first axis $A_1$ is being counteracted by the first damper 6a and the first suspension spring 7a upon activation of the first lever 2a, and the rotary movement of the second lever 2b around the second axis $A_2$ is being counteracted by the second damper 6b and the second suspension spring 7b upon activation of the second lever 2b.

The system 1 further comprises a centre part damper 9, as shown in FIGS. 1 and 2. The centre part damper 9 is configured for dampening the movement of the centre part 5 in the transverse direction $D_T$. The centre part damper 9 may have a configuration where it is dampening fast impacting movements of the centre part 5, preventing any larger movements of the centre part 5 for example when the vehicle is driving on a road and hits a road bump. The centre part damper 9 is configured to dampen the movement of the centre part 5 when fast progressing force sequences are impacting the system 1. The centre part damper 9 may further have a configuration where it is allowing movements of the centre part 5 when the forces acting on the system are not fast progressing. This may for example be the case when the vehicle is moving through a curve or when the vehicle is making a turn. The forces acting on the vehicle build up more slowly in a slow progressing force sequence in the system 1. If desired the centre part damper 9 may have other suitable configurations. The centre part damper 9 is thus used for preventing or limiting movements of the centre part 5 when rapid impacting forces are acting on the system 1, and allowing movements of the centre part 5 when slower impacting forces are acting on the system 1. The centre part damper 9 may have any suitable configuration and design.

Figure 5:
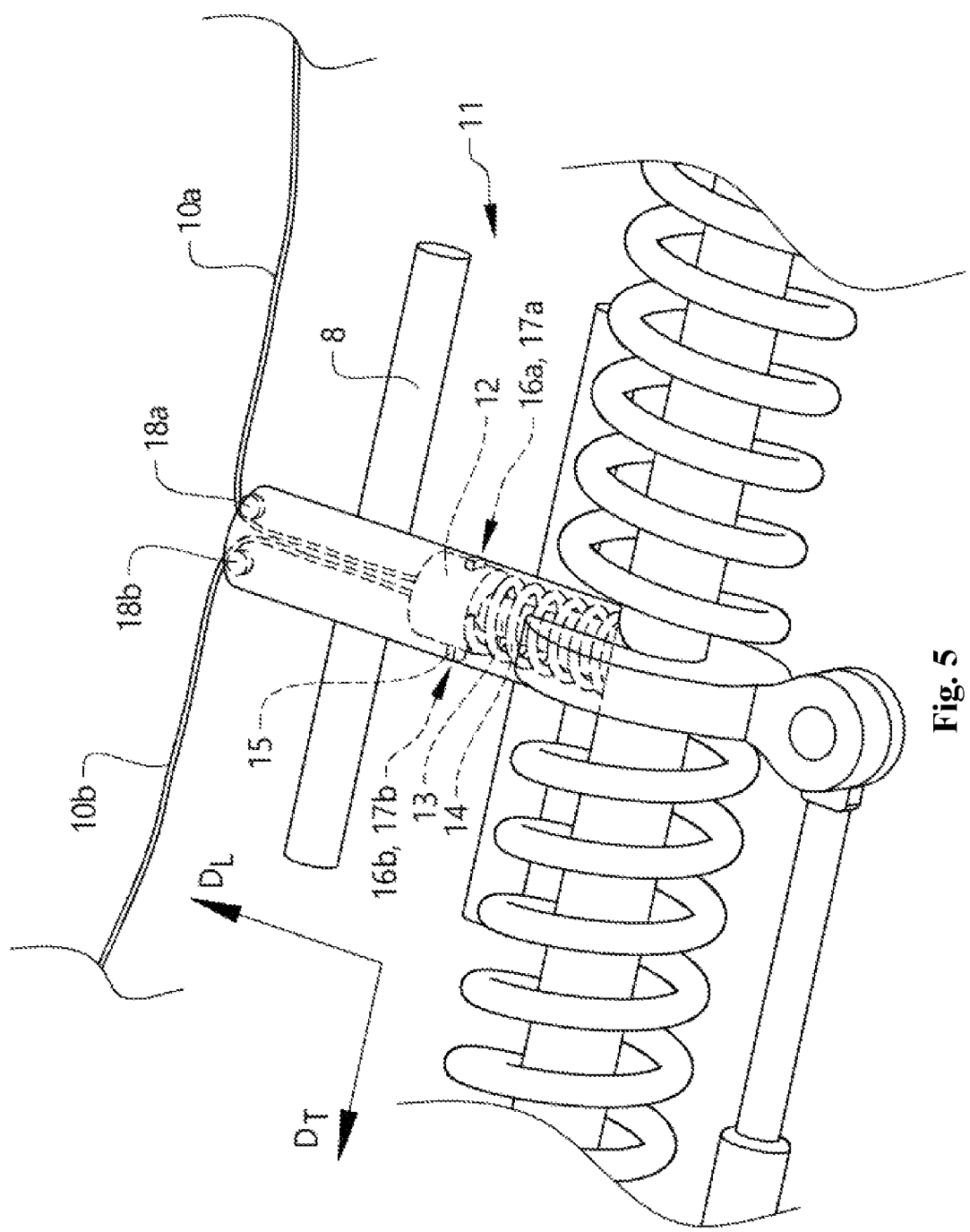
FIG. 5 shows schematically, in a perspective view, a section of the anti-roll wheel suspension system with the centre part according to the disclosure.

The system 1 further comprises a first wire 10a, a second wire 10b, and a wire restricting unit 11, as illustrated in FIGS. 1, 2 and 5. The wire restricting unit 11 is attached to the centre part 5. The first wire 10a is connected to and extending between the second lever end 21b of the first lever 2a and the wire restricting unit 11. The second wire 10b is connected to and extending between the second lever end 22b of the second lever 2b and the wire restricting unit 11. Upon activation of the first lever 2a, the first wire 10a is arranged for restricting the rotary movement of the first lever 2a in the first rotational direction $D_{R1}$, and the wire restricting unit 11 is configured for dampening and restricting a movement of the first wire 10a. Thus, when the first lever 2a upon activation is rotated in the first rotational direction $D_{R1}$ around the first axis $A_1$ in the first pivot point, the second lever end 21b of the first lever 2a is moving in a direction away from the centre part 5. During this movement, the first wire 10a is stretched and the wire restricting unit 11 is dampening and restricting the movement of the first wire 10a. Upon activation of the second lever 2b, the second wire 10b is arranged for restricting the rotary movement of the second lever 2b in the second rotational direction $D_{R2}$, and the wire restricting unit 11 is configured for dampening and restricting a movement of the second wire 10b. Thus, when the second lever 2b upon activation is rotated in the second rotational direction $D_{R2}$ around the second axis $A_2$ in the second pivot point, the second lever end 22b of the second lever 2b is moving in a direction away from the centre part 5. During this movement, the second wire 10b is stretched and the wire restricting unit 11 is dampening the movement of the second wire 10b. The wires may be made of any suitable material such as for example steel, polymers, or composite fibre materials. The dampening of the wire movements will take place if the system is not impacted by a side force larger than a predetermined force level, as will be further explained below.

With the configuration of the system 1 described, the rotary movement of the first lever 2a is restricted with the first wire 10a upon activation of the first lever 2a, and the rotary movement of the second lever 2b is restricted with the second wire 10b upon activation of the second lever 2b. Upon activation of the first lever 2a, the wire restricting unit 11 is dampening a movement of the first wire 10a, and upon activation of the second lever 2b the wire restricting unit 11 is dampening a movement of the second wire 10b.

The wire restricting unit 11 comprises a piston 12 movably arranged in a longitudinal direction $D_L$ in relation to the centre part 5, a secondary damper 13, and a secondary suspension spring 14, as illustrated in FIG. 5. The secondary damper 13 is arranged inside the secondary suspension spring 14 forming a damper package. The damper package is at a first end connected to the centre part 5 and at a second end connected to the movable piston 12. The centre part 5 may have a tube-like section forming a housing structure for the piston 12, the secondary damper 13, and the secondary suspension spring 14, where the piston 12 is movably arranged in the housing structure. In this way, the wire restricting unit 11 is arranged inside the centre part 5. The secondary damper 13 and the secondary suspension spring 14 may have any suitable configuration.

The first wire 10a and the second wire 10b are connected to the piston 12. The secondary damper 13 and the secondary suspension spring 14 are arranged for dampening the movement of the piston 12 in the longitudinal direction $D_L$. When the first wire 10a is stretched and/or the second wire 10b is stretched, the connection of the wires to the piston 12 is thus allowing the dampening unit 11 to dampen the movements of the wires.

The wire restricting unit 11 further comprises a spring-loaded locking pin 15, as shown in FIG. 5. The spring-loaded locking pin 15 is arranged for blocking the movement of the piston 12 when a side force above a predetermined force level is impacting the system 1 in the transverse direction $D_T$. Side forces may impact the system 1 for example when the vehicle is making a turn. The locking pins 15 are thus not blocking the movement of the piston 12 when the vehicle is driving in a direction straight ahead without turning, or when the vehicle is driving in a direction straight ahead and the first wheel 4a and/or the second wheel 4b hit bumps in the road. Further, the predetermined force level may be chosen to allow small side forces impacting the system 1, such as for example when the vehicle is driving through a long curve. When the vehicle is driving in tighter curves, the side forces impacting the vehicle is higher and the system may be calibrated to block the movement of the piston 12 for such tighter curves. When the movement of the piston 12 is blocked with the locking pin 15 above the predetermined force level, the secondary damper 13 and the secondary suspension spring 14 are prevented from dampening the movement of the piston 12 in the longitudinal direction $D_L$.

The wire restricting unit 11 is with the configuration of the system 1 described, arranged for dampening a movement of the first wire 10a with the wire restricting unit 11 upon activation of the first lever 2a, when a side force equal to or below the predetermined force level is impacting the system 1 in the transverse direction $D_T$. The wire restricting unit 11 is further prevented from dampening the movement of the first wire 10a when a side force above the predetermined force level is impacting the system 1 in the transverse direction $D_T$. The wire restricting unit 11 is further arranged for dampening a movement of the second wire 10b with the wire restricting unit 11 upon activation of the second lever 2b, when the side force equal to or below the predetermined force level is impacting the system 1 in the transverse direction $D_T$. The wire restricting unit 11 is further prevented from dampening the movement of the second wire 10b when a side force above the predetermined force level is impacting the system 1 in the transverse direction $D_T$.

As indicated in FIG. 5, the locking pin 15 comprises a first locking surface 16a and a second locking surface 16b. The centre part 5 comprises a first recess 17a and a second recess 17b. The first locking surface 16a is arranged for engaging the first recess 17a when the side force above the predetermined force level is acting in a first direction, and the second locking surface 16b is arranged for engaging the second recess 17b when the side force above the predetermined force level is acting in a second direction, where the first direction and the second direction are opposite each other in the transverse direction. The locking pin may for example be slidingly arranged in the piston 12, and allowed to move in the first or second directions when impacted by side forces above the predetermined force level, for a locking engagement with the corresponding recess.

The wire restricting unit 11 may further comprise a first guide wheel 18a and a second guide wheel 18b arranged in connection to the housing structure of the centre part 5, as illustrated in FIGS. 2 and 5. The first guide wheel 18a is arranged for guiding the movement of the first wire 10a to the piston 12, and the second guide wheel 18b is arranged for guiding the movement of the second wire 10b to the piston 12.

In a first exemplified driving scenario, the vehicle is driving in a direction straight ahead and side forces below the predetermined force level is impacting the system 1 in the transverse direction $D_T$. The locking pin 15 is in this scenario not in locking engagement with the locking surfaces, and the piston 12 is allowed to move in relation to the centre part 5 for dampening the movements of the first and second wires. If the first wheel 4a on the left hand side of the vehicle is hitting a road bump, the first wheel 4a is pushed in a direction upwards. When the first wheel 4a is pushed upwards, the first suspension arm 3a is being rotated around the third axis $A_3$, and through the engagement with the first lever 2a, the first lever 2a is rotated around the first axis $A_1$ in the first rotational direction $D_{R1}$. In the configuration illustrated in FIG. 2, the first rotational direction $D_{R1}$ is in a clockwise direction. During the rotational movement of the first lever 2a around the first axis $A_1$ in the first rotational direction $D_{R1}$, the first lever end 21a is moving in a direction towards the centre part 5 and the second lever end 21b is moving in a direction away from the centre part 5. The first lever end 21a is impacting the first lever damper 6a and the first suspension spring 7a, where the first suspension spring 7a is being compressed and the first lever damper 6a is dampening the movement of the first lever 2a in relation to the centre part 5. Through the compression of the first suspension spring 7a the first suspension spring is pushing the centre part 5 in a direction towards the right side of the vehicle. However, since the road bump is acting on the system 1 with a rapid impacting force change, the centre part damper 9 is dampening and preventing the movement of the centre part 5 along the guide bars 8. The rotational movement of the first lever 2a is thus counteracted through the spring force of the first suspension spring 7a together with the dampening function of the first lever damper 6a, which is preventing roll of the vehicle. At the same time, during the rotational movement of the first lever 2a around the first axis $A_1$ in the first rotational direction $D_{R1}$, the second lever end 21a is stretching the first wire 10a. The movement of the stretched first wire 10a is dampened by the wire damping unit 11, and the rotational movement of the first lever 2a is further counteracted through the first wire 10a and the wire restricting unit 11, which is preventing roll of the vehicle. As understood by the skilled person, the system works with the same roll preventing functionality if instead the second wheel 4b on the right hand side of the vehicle is hitting a road bump.

In a second exemplified driving scenario, the vehicle is driving along a curve and a side force above the predetermined force level is impacting the system 1 in the transverse direction $D_T$. The locking pin 15 is in this scenario in locking engagement with the locking surfaces, and the piston 12 is prevented from moving in relation to the centre part 5. The wire restricting unit 11 is therefore not dampening the movements of the first and second wires, and the wires are directly connected to the centre part 5 without the dampening function. If the vehicle is driving in a curve turning to the right, the first wheel 4a on the left vehicle side is pushed in a direction upwards in relation to the vehicle due to the forces acting on the vehicle. When the first wheel 4a is pushed upwards, the first suspension arm 3a is being rotated around the third axis $A_3$, and through the engagement with the first lever 2a, the first lever 2a is rotated around the first axis $A_1$ in the first rotational direction $D_{R1}$. In the configuration illustrated in FIG. 2, the first rotational direction $D_{R1}$ is in a clockwise direction. During the rotational movement of the first lever 2a around the first axis $A_1$ in the first rotational direction $D_{R1}$, the first lever end 21a is moving in a direction towards the centre part 5 and the second lever end 21b is moving in a direction away from the centre part 5. The first lever end 21a is impacting the first lever damper 6a and the first suspension spring 7a, where the first suspension spring 7a is being compacted and the first lever damper 6a to a certain degree is dampening the movement of the first lever 2a in relation to the centre part 5. Through the compression of the first suspension spring 7a the first suspension spring is pushing the centre part 5 in a direction towards the right hand side of the vehicle. The forces acting on the vehicle during the turn along the curve is built up slowly in a slow progressing force sequence in the system 1, and therefore the centre part damper 9 is not dampening and preventing the movement of the centre part 5 along the guide bars 8. The rotational movement of the first lever 2a is through the spring force of the first suspension spring 7a pushing the centre part 5 along the guide bars 8 in a direction towards the right vehicle side. At the same time, during the rotational movement of the first lever 2a around the first axis $A_1$ in the first rotational direction $D_{R1}$, the second lever end 21b is stretching the first wire 10a. The stretching of the first wire 10a is counteracting the movement of the centre part 5 along the guide bars 8 in one direction, since the first wire 10a through the locking engagement of the locking pin is connected to the centre part 5 without dampening function. The counteracting movement of the centre part 5 through the first wire 10a is preventing roll of the vehicle. Further, during the sequence, the first lever damper 6a is dampening the rotational movement of the first lever 2a, which also to a certain degree is counteracting the rotational movement of the first lever arm 2a and preventing roll of the vehicle. The stretching of the first wire 10a is moving the centre part 5 in a direction towards the first lever, since slack in the second wire 10b on the opposite side of the centre part 5 is allowing the movement of the centre part 5. The system components are in this scenario cooperating to preventing the roll of the vehicle. As understood by the skilled person, the system works with the same roll preventing functionality if instead the vehicle is driving through a curve turning to the left.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Anti-roll wheel suspension system
2a: First lever
2b: Second lever
3a: First suspension arm
3b: Second suspension arm
4a: First wheel
4b: Second wheel
5: Centre part
6a: First damper
6b: Second damper
7a: First suspension spring
7b: Second suspension spring
8: Guide bar
9: Centre part damper
10a: First wire
10b: Second wire
11: Wire restricting unit
12: Piston
13: Secondary damper
14: Secondary suspension spring
15: Locking pin
16a: First locking surface
16b: Second locking surface
17a: First recess
17b: Second recess
18a: First guide wheel
18b: Second guide wheel
19a: First level bevel gear wheel
19b: Second level bevel gear wheel
20a: First arm bevel gear wheel
20b: Second arm bevel gear wheel
21a: First lever end, First lever
21b: Second lever end, First lever
22a: First lever end, Second lever
22b: Second lever end, Second lever

What is claimed is:

1. An anti-roll wheel suspension system for vehicles, comprising a first suspension spring and a first damper arranged to be connected to a first wheel, and a second suspension spring and a second damper arranged to be connected to a second wheel;

wherein the system further comprises a centre part operatively connected to the first suspension spring and the first damper, and operatively connected to the second suspension spring and the second damper, wherein the centre part is arranged between the first suspension spring and the second suspension spring, and between the first damper and the second damper;

wherein the centre part is movably arranged in a transverse direction, wherein the centre part when moving in the transverse direction upon activation from the first wheel and/or the second wheel is configured for impacting the stiffness of the first suspension spring and/or the second suspension spring, wherein the first suspension spring and the first damper are arranged to be connected to the first wheel via a first lever and a first suspension arm, and wherein the second suspension spring and the second damper are arranged to be connected to the second wheel via a second lever and a second suspension arm, wherein the first suspension arm is connected to and extends between the first wheel and the first lever, wherein the second suspension arm is connected to and extends between the second wheel and the second lever;

wherein the first damper and the first suspension spring are connected to and extends between the first lever and the centre part, and wherein the second damper and the second suspension spring are connected to and extends between the second lever and the centre part;

wherein the first lever and the first suspension arm are configured for interacting with each other, and wherein the second lever and the second suspension arm are configured for interacting with each other;

wherein upon activation of the first lever by the first wheel and the first suspension arm the first lever rotates around a first axis, and wherein upon activation of the second lever by the second wheel and the second suspension arm the second lever rotates around a second axis;

wherein the system further comprises a first wire, a second wire, and a wire restricting unit attached to the centre part;

wherein the first wire is connected to and extends between the first lever and the wire restricting unit, and wherein the second wire is connected to and extends between the second lever and the wire restricting unit;

wherein, upon activation of the first lever, the first wire restricts the rotary movement of the first lever, and wherein, upon activation of the second lever, the second wire restricts the rotary movement of the second lever; and wherein, upon activation of the first lever, the wire restricting unit dampens a movement of the first wire, and wherein, upon activation of the second lever, the wire restricting unit dampens a movement of the second wire.

2. The system according to claim 1,
wherein the centre part is arranged to be slidingly connected to at least one elongated guide bar extending in the transverse direction, wherein the centre part upon activation of the first lever and/or the second lever is configured for sliding in the transverse direction along the at least one guide bar and wherein the centre part when sliding in the transverse direction is configured for impacting the stiffness of the first suspension spring and/or the second suspension spring; and wherein upon activation of the first lever the first damper and the first suspension spring are configured for counteracting a rotary movement of the first lever around the first axis, and wherein upon activation of the second lever the second damper and the second suspension spring are configured for counteracting a rotary movement of the second lever around the second axis.

3. The system according to claim 1,
wherein the system further comprises a centre part damper, wherein the centre part damper is configured for dampening a movement of the centre part in the transverse direction.

4. The system according to claim 1,
wherein the wire restricting unit comprises a piston movably arranged in a longitudinal direction in relation to the centre part, a secondary damper, and a secondary suspension spring;

wherein the first wire and the second wire are connected to the piston; and wherein the secondary damper and the secondary suspension spring are arranged for dampening the movement of the piston in the longitudinal direction.

5. The system according to claim 1,
wherein the wire restricting unit further comprises a spring-loaded locking pin, wherein the spring-loaded locking pin is arranged to block the movement of the piston when a side force above a predetermined force level impacts the system in the transverse direction.

6. The system according to claim 5,
wherein the locking pin comprises a first locking surface and a second locking surface, and wherein the centre part comprises a first recess and a second recess; wherein the first locking surface is arranged to engage the first recess when the side force acts in a first direction, and wherein the second locking surface is arranged to engage the second recess when the side force acts in a second direction, where the first direction and the second direction are opposite each other.

7. The system according to claim 1,
wherein the wire restricting unit comprises a first guide wheel arranged to guide the movement of the first wire, and a second guide wheel arranged to guide the movement of the second wire.

8. The system according to claim 1,
wherein the wire restricting unit is arranged inside the centre part.

9. An anti-roll wheel suspension system for vehicles, comprising a first suspension spring and a first damper arranged to be connected to a first wheel, and a second suspension spring and a second damper arranged to be connected to a second wheel;
wherein the system further comprises a centre part operatively connected to the first suspension spring and the first damper, and operatively connected to the second suspension spring and the second damper, wherein the centre part is arranged between the first suspension spring and the second suspension spring, and between the first damper and the second damper;
wherein the centre part is movably arranged in a transverse direction, wherein the centre part when moving in the transverse direction upon activation from the first wheel and/or the second wheel is configured for impacting the stiffness of the first suspension spring and/or the second suspension spring,
wherein the first suspension spring and the first damper are arranged to be connected to the first wheel via a first lever and a first suspension arm, and wherein the second suspension spring and the second damper are arranged to be connected to the second wheel via a second lever and a second suspension arm, wherein the first suspension arm is connected to and extends between the first wheel and the first lever, wherein the second suspension arm is connected to and extends between the second wheel and the second lever;
wherein the first damper and the first suspension spring are connected to and extends between the first lever and the centre part, and wherein the second damper and the second suspension spring are connected to and extends between the second lever and the centre part;
wherein the first lever and the first suspension arm are configured for interacting with each other, and wherein the second lever and the second suspension arm are configured for interacting with each other;
wherein upon activation of the first lever by the first wheel and the first suspension arm the first lever rotates around a first axis, and wherein upon activation of the second lever by the second wheel and the second suspension arm the second lever rotates around a second axis; and
wherein the first lever is connected to a first lever bevel gear wheel and the second lever is connected to a second lever bevel gear wheel, wherein the first suspension arm is connected to a first arm bevel gear wheel and the second suspension arm is connected to a second arm bevel gear wheel; wherein the first lever bevel gear wheel is in engagement with the first arm bevel gear wheel and the second lever bevel gear wheel is in engagement with the second arm bevel gear wheel.

10. The system according to claim 9,
wherein the first lever bevel gear wheel is arranged for rotating around the first axis and the second lever bevel gear wheel is arranged for rotating around the second axis, wherein the first arm bevel gear wheel is arranged for rotating around a third axis and the second arm bevel gear wheel is arranged for rotating around a fourth axis.

11. The system according to claim 1,
wherein, upon activation, the first lever rotates in a first rotational direction around the first axis, and wherein, upon activation, the second lever rotates in a second rotational direction around the second axis, wherein the first rotational direction and the second rotational direction are opposite each other.

12. The system according to claim 1,
wherein the first damper is connected to a first lever end of the first lever and the second damper is connected to a first lever end of the second lever, wherein, upon activation, the first lever end of the first lever rotates in the first rotational direction towards the centre part, and wherein, upon activation, the first lever end of the second lever rotates in the second rotational direction towards the centre part.

13. A vehicle comprising the anti-roll wheel suspension system according to claim 1.

14. A method for performing anti-roll of a vehicle with an anti-roll wheel suspension system for vehicles, wherein the system comprises a first suspension spring and a first damper arranged to be connected to a first wheel, and a second suspension spring and a second damper arranged to be connected to a second wheel; wherein the system further comprises a centre part operatively connected to the first suspension spring and the first damper, and operatively connected to the second suspension spring and the second damper, wherein the centre part is arranged between the first suspension spring and the second suspension spring, and between the first damper and the second damper; wherein the centre part is movably arranged in a transverse direction;
wherein the first suspension spring and the first damper are arranged to be connected to the first wheel via a first lever and a first suspension arm, and wherein the second suspension spring and the second damper are arranged to be connected to the second wheel via a second lever and a second suspension arm, wherein the first suspension arm is connected to and extends between the first wheel and the first lever, wherein the second suspension arm is connected to and extends between the second wheel and the second lever;
wherein the first damper and the first suspension spring are connected to and extends between the first lever and the centre part, and wherein the second damper and the second suspension spring are connected to and extends between the second lever and the centre part;
wherein the first lever and the first suspension arm are configured for interacting with each other, and wherein the second lever and the second suspension arm are configured for interacting with each other;
the method comprises:
moving the centre part in the transverse direction upon activation from the first wheel and/or the second wheel, wherein the centre part upon movement impacts the stiffness of the first suspension spring and/or the second suspension spring;

rotating the first lever around a first axis upon activation of the first lever by the first wheel and the first suspension arm, and rotating the second lever around a second axis upon activation of the second lever by the second wheel and the second suspension arm;

wherein the system further comprises a first wire, a second wire, and a wire restricting unit attached to the centre part;

wherein the first wire is connected to and extends between the first lever and the wire restricting unit, and wherein the second wire is connected to and extends between the second lever and the wire restricting unit, the method further comprises:

restricting the rotary movement of the first lever with the first wire upon activation of the first lever, and restricting the rotary movement of the second lever with the second wire upon activation of the second lever;

wherein upon activation of the first lever the wire restricting unit dampens a movement of the first wire, and wherein upon activation of the second lever the wire restricting unit dampens a movement of the second wire.

15. The method according to claim 14, wherein the centre part is arranged to be slidingly connected to at least one elongated guide bar extending in the transverse direction, wherein the centre part upon activation of the first lever and/or the second lever is configured for sliding in the transverse direction along the at least one guide bar and wherein the centre part when sliding in the transverse direction is configured for impacting the stiffness of the first suspension spring and/or the second suspension spring; the method further comprises:

counteracting the rotary movement of the first lever around the first axis by the first damper and the first suspension spring upon activation of the first lever, and counteracting the rotary movement of the second lever around the second axis by the second damper and the second suspension spring upon activation of the second lever.

16. The method according to claim 14, wherein the method further comprises:

upon activation of the first lever, dampening a movement of the first wire with the wire restricting unit when a side force equal to or below a predetermined force level impacts the system in the transverse direction, wherein the wire restricting unit is prevented from dampening the movement of the first wire when a side force above the predetermined force level impacts the system in the transverse direction; and upon activation of the second lever, dampening a movement of the second wire with the wire restricting unit when the side force equal to or below the predetermined force level impacts the system in the transverse direction, wherein the wire restricting unit is prevented from dampening the movement of the second wire when a side force above the predetermined force level impacts the system in the transverse direction.

* * * * *